United States Patent
Patil et al.

(10) Patent No.: US 7,174,018 B1
(45) Date of Patent: Feb. 6, 2007

(54) SECURITY FRAMEWORK FOR AN IP MOBILITY SYSTEM USING VARIABLE-BASED SECURITY ASSOCIATIONS AND BROKER REDIRECTION

(75) Inventors: Basavaraj B. Patil, Plano, TX (US); Raja P. Narayanan, Irving, TX (US); Haseeb Akhtar, Garland, TX (US); Emad A. Qaddoura, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 789 days.

(21) Appl. No.: 09/595,551

(22) Filed: Jun. 16, 2000

Related U.S. Application Data

(60) Provisional application No. 60/140,704, filed on Jun. 24, 1999.

(51) Int. Cl.
*H04K 1/00* (2006.01)
*H04L 9/00* (2006.01)

(52) U.S. Cl. .............. 380/258; 380/270; 713/153; 713/154

(58) Field of Classification Search ............ 380/258, 380/270; 713/154, 153
See application file for complete search history.

(56) References Cited

U.S. PATENT DOCUMENTS

| | | | |
|---|---|---|---|
| 5,539,824 A * | 7/1996 | Bjorklund et al. | 380/249 |
| 5,793,762 A | 8/1998 | Penners et al. | |
| 5,883,890 A | 3/1999 | Okanoue et al. | |
| 5,905,719 A | 5/1999 | Arnold et al. | |
| 6,170,057 B1 * | 1/2001 | Inoue et al. | 713/153 |
| 6,253,326 B1 * | 6/2001 | Lincke et al. | 713/201 |
| 6,487,657 B1 * | 11/2002 | Brockmann | 713/154 |
| 6,507,908 B1 * | 1/2003 | Caronni | 713/153 |

OTHER PUBLICATIONS

Pat R. Calhoun, DIAMETER Mobile IP Extensions, Nov. 1998, Sun Laboratories, pp. 1-27.*
Pat R. Calhoun, Diameter Framework Document, Feb. 2001, Sun Laboratories, pp. 1-26.*

(Continued)

*Primary Examiner*—Kambiz Zand
*Assistant Examiner*—Benjamin E. Lanier
(74) *Attorney, Agent, or Firm*—Hemingway & Hansen, LLP; D. Scott Hemingway; Malcolm W. Pipes

(57) ABSTRACT

In an IP-based mobile communications system, the Mobile Node changes its point of attachment to the network while maintaining network connectivity. Security concerns arise in the mobile system because authorized users are subject to the following forms of attack: (1) session stealing where a hostile node hijacks session from mobile node by redirecting packets, (2) spoofing where the identity of an authorized user is utilized in an unauthorized manner to obtain access to the network, and (3) eavesdropping and stealing of data during session with authorized user. No separate secure network exists in the IP-based mobility communications system, and therefore, it is necessary to protect information transmitted in the mobile system from the above-identified security attacks.

The present invention improves the security of communications in a IP mobile communications system by creating variable-based Security Associations between various nodes on the system, a Virtual Private Network supported by an Service Level Agreement between various foreign networks and a home network, and an SLA Broker to promote large-scale roaming among different SLAs supported by the SLA Broker or agreements with other SLA Brokers.

37 Claims, 2 Drawing Sheets

OTHER PUBLICATIONS

Pat R. Calhoun, Diameter Base Protocol, Feb. 2001, Sun Laboratories, pp. 1-57.*

La Porta, Thomas F.; Salgarelli, Luca; Foster, Gerald T.; "Mobile IP and Wide Area Wireless Data;" 1998, IEEE.

Perkins, Charles E.; "Tutorial: Mobile Networking Through Mobile IP;" Jan. 1998; IEEE Internet Computing.

Perkins, CV; "RFC 2002: IP Mobility Support;" Oct. 1996, Network Working Group.

* cited by examiner

SECURITY FRAMEWORK FOR AN IP MOBILITY SYSTEM USING VARIABLE-BASED SECURITY ASSOCIATIONS AND BROKER REDIRECTION

RELATED APPLICATION DATA

This application is the utility patent application related to provisional application Ser. No. 60/140,704 filed Jun. 24, 1999.

TECHNICAL FIELD OF THE INVENTION

A security framework for an IP-based mobile communication system having a home network, foreign network and a mobile node.

BACKGROUND OF THE INVENTION

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

Defense Department officials requested that a system be built to permit communication between these different computer networks. The Defense Department recognized, however, that a single centralized system would be vulnerable to missile attacks or sabotage. Accordingly, the Defense Department mandated that the system to be used for communication between these military computer networks be decentralized and that no critical services be concentrated in a few, vulnerable failure points. In order to achieve these goals, the Defense Department established a decentralized standard protocol for communication between network computers.

A few years later, the National Science Foundation (NSF) wanted to connect network computers at various research institutions across the country. The NSF adopted the Defense Department's protocol for communication, and this combination of research computer networks would eventually evolve into the Internet.

Internet Protocols

The Defense Department's communication protocol governing data transmission between computers on different networks was called the Internet Protocol (IP) standard. The IP standard now supports communications between computers and networks on the Internet. The IP standard identifies the types of services to be provided to users, and specifies the mechanisms needed to support these services. The IP standard also describes the upper and lower system interfaces, defines the services to be provided on these interfaces, and outlines the execution environment for services needed in the system.

A transmission protocol, called the Transmission Control Protocol (TCP), was also developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

The TCP/IP Protocol

In a typical Internet-based communication scenario, data is transmitted from an applications program in a first computer, through the first computer's network hardware, and across the transmission medium to the intended destination on the Internet. After receipt at a destination computer network, the data is transmitted through the destination network to a second computer. The second computer then interprets the communication using the identical protocols on a similar application program. Because of the standard protocols used in Internet communications, the TCP/IP protocol on the second computer decodes the transmitted information into the original information transmitted by the first computer.

One of the rules in TCP/IP communications is that a computer user does not need to get involved with details of data communication. In order to accomplish this goal, the TCP/IP standard imposes a layered communications system structure. All the layers are located on each computer in the network, and each module or layer is a separate component that theoretically functions independent of the other layers.

TCP/IP and its related protocols form a standardized system for defining how data should be processed, transmitted and received on the Internet. TCP/IP defines the network communication process, and more importantly, defines how a unit of data should look and what information the message should contain so that the receiving computer can interpret the message correctly. Because the standardized layer design of TCP/IP, a consistent conversion of base data is ensured regardless of the version or vendor of the TCP/IP conversion software.

TCP/IP Addressing and Routing

A computer operating on a network is assigned a unique physical address. On a Local Area Network ("LAN"), the physical address of the computer is a number given to computer's network adapter card. Hardware LAN protocols use this physical address to deliver packets of data to computers on the LAN.

On the Internet, the TCP/IP protocol routes information packets using logical addressing. The network software in the Network Layer generates logical addresses. Specifically, a logical address in the TCP/IP network is translated into a corresponding physical address using the ARP (Address Resolution Protocol) and RARP (Reverse Address Resolution Protocol) protocols in the Network Layer.

The TCP/IP's logical address is also called an IP address. The IP address can include: (1) a network ID number identifying a network, (2) a sub-network ID number identifying a sub-network on the network, and, (3) a host ID number identifying a particular computer on the sub-network. The header data in the information packet will include source and destination addresses. The IP addressing scheme imposes a sensible addressing scheme that reflects the internal organization of the network or sub-network.

A computer network is often subdivided into smaller sub-networks. The computer network is divided in this manner to increase data transmission efficiency and reduce overall network traffic. Routers are used to regulate the flow of data into and out of designated sub-networks of the computer network.

A router interprets the logical address information of a data packet, such as an IP address, and directs the data packet across the network to its intended destination. Data addressed between computers on the sub-network does not pass through the router to the greater network, and therefore does not clutter the transmission lines of the greater network. If data is addressed to a computer outside the sub-network, however, the router forwards the data onto the larger network.

The TCP/IP network includes protocols that define how routers will determine the path for data through the network. Routing decisions are based upon information in the IP packet header and entries in each router's routing table. A routing table possesses sufficient information for a router to make a determination on whether to accept the communicated information on behalf of a destination computer, or pass the information onto another router in the network. The routing table also permits the router to determine where the information should be forwarded within the network or sub-network.

The routing table can be configured manually with routing table entries or a dynamic routing protocol that can accommodate changing network topologies—network architecture or network layouts, routers, and interconnections between hosts and routers. In a dynamic routing protocol, a router advertises reachability when it sends updated routing information to a second router claiming that the first router is capable of reaching one or more destination addresses. Advertising accessibility is important to the process of receiving, directing and re-directing data packets on the Internet.

Confidential Communications Over a Public Network

Because information packets are routed over the public networks that make up the Internet, cryptographic security systems are used to send communications in a confidential manner. These security systems maintain the confidentiality of the information packet by encoding, or encrypting, the information in the information packet. The encryption process can only be reversed, or decoded, by an authorized person. Other activities performed by the security system include authentication (you are who you say you are), integrity checking (the information packet was sent in the decoded form) and non-repudiation (identification of person sending the information packet).

A cryptographic security system consists of two fundamental components—a complicated mathematical algorithm for encrypting the information, and one or more values, called keys, known to parties authorized to transmit or receive the information packet. The greater the complexity of the algorithm, the stronger the cryptographic level of security in the cryptographic system. Because of its complexity, the algorithm can be kept secret or publicly disclosed without undermining the strength of the security system.

As an example of the encryption process, let's examine the situation where Party A intends to communicate confidentially with Party B using the cryptographic security system. First, Party A uses the algorithm and a key to transform the information in the transmitted information packet into encrypted information. In order to maintain the confidentiality of the transmitted information, the encrypted information does not resemble the information in the information packet, and the encrypted information cannot be easily decoded into its original form without the use of the algorithm and a key.

As such, the encrypted information is transmitted over the public networks on the Internet to Party B without disclosing the content of the original information packet. After receiving the encrypted information packet, Party B decodes the encrypted information using the algorithm and a key. When the encrypted information is decoded, the original information should be disclosed in the decoded information packet.

Key-Based Cryptographic Systems

It is preferable that the key be known only to the appropriate or authorized parties to the communication. This type of key is known as a "secret key", and the sender and receiver of the information packet use the same secret key to encrypt and decode information packets with the algorithm. Public key encryption is also supported by cryptographic security systems where the sender has a public key and a private key, and the receiver has a public key and a private key. Messages may be encoded by the sender using the receiver's public key, and decoded by the receiver using the receiver's private key. Hybrid security systems are also used to encrypt and decode information in information packets. Accordingly, key-based security systems rely on the use of some type of secret key to support confidential communications.

SUMMARY OF THE INVENTION

Internet protocols were originally developed with an assumption that Internet users, which are assigned a unique IP address, would be connected to a single, fixed network—that is, one physical fixed location. With the advent of portable computers and cellular wireless communication systems, however, the movement of Internet users within a network and across network boundaries has become quite common. Because of this highly mobile Internet usage, the implicit design assumptions for the Internet protocols have been violated.

The IP-Based Mobile System

The IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single Mobile Node home network for IP addressing purposes.

The home network has a Home Agent and the foreign network has a Foreign Agent—both of which control the routing of information packets into and out of their network. The terms Home Agent and Foreign Agent may be defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network having the responsibility to manage mobility-related functionality for a Mobile Node on a home network. Likewise, the term Foreign Agent, as used in this application, can refer to a Serving Mobility Manager, Visited Location Register, Visiting Serving Entity, or any other agent on a foreign network having the responsibility to manage mobility-related functionality for a Mobile Node on a foreign network.

Security System for the IP-Based Mobile System

In an IP-based mobile communications system, the Mobile Node changes its point of attachment to the network while maintaining network connectivity. Security concerns arise in the mobile system because authorized users are subject to the following forms of attack: (1) session stealing where a hostile node hijacks the network session from mobile node by redirecting information packets, (2) spoofing where the identity of an authorized user is utilized in an unauthorized manner to obtain access to the network, and (3) eavesdropping and stealing of information during a session with an authorized user. No separate secure network exists in the IP-based mobility communications system, and therefore, it is necessary to protect information transmitted in the mobile system from the above-identified security attacks.

The present invention improves the security of communications in a IP-based mobile communications system by creating variable-based Security Associations (SAs) between various nodes on the system, a Virtual Private Network supported by a Service Level Agreement (SLA) between various foreign networks and a home network, and an SLA Broker to promote large-scale roaming among different SLAs supported by the SLA Broker or agreements with other SLA Brokers. Any one of these aspects will improve the security of the system, and each aspect is independently covered by the present invention.

Variable-Based Security Associations

Security Associations, called SAs, are relationships between secure nodes, or routers, of the Internet. The present invention establishes SAs between various nodes and agents on the system to comprehensively, and flexibly, cover connections in the network.

Service Level Agreements (SLAs) and Virtual Private Networks (VPNs)

A service level agreement (SLA) may be created between networks on the Internet to establish Security Associations between Authentication, Authorization, and Accounting ("AAA") servers on various administrative domains or networks. The AAA servers on the SLAs can assist in the management of SAs and the uniform transfer of encrypted information packets between AAA servers using a well-defined security protocol.

An SLA can be formed between the AAA servers on several foreign networks and a home network. By working cooperatively, the AAA servers form a secure network for communications. Essentially, this system forms a Virtual Private Network (or "VPN") between the foreign networks and the home network thereby supporting secure tunneling of information packets among the networks on the VPN.

SLA Brokers

To eliminate the need for each network to establish individual SLA's with every other service provider and network on the Internet, SLA brokers can be assigned the responsibility of establishing and maintaining SLAs found on different networks (and reciprocal agreements with other SLAs and SLA Brokers). Accordingly, the SLA Broker becomes a consortium of agreements between various networks and service providers.

A home network need only establish one relationship with the SLA Broker in order to gain access to the other SLAs supported by the SLA Broker. With the support of such an SLA Broker, a mobile node from the home network can roam about any other network supported by the home network's SLA Broker.

While the present invention can operate under the Mobile IP (RFC 2002), IPSec, and/or Internet Key Exchange (IKE) protocols, the invention is not limited to these protocols and can be used with any IP-based mobile system and associated security protocols.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Mobile IP protocols support the routing of data communications to Mobile Nodes on the Internet. For the most part, each Mobile Node in a mobile IP system is identified by a permanent IP address associated with a home network. While the Mobile Node is coupled to its home network, the Mobile Node functions as any other fixed node on that network. When the Mobile Node moves from its home network to a foreign network, however, the home network sends data communications to the Mobile Node through the foreign network. This transmission of the information packet from the home network to the foreign network is called "tunneling" the information packet to the foreign network and/or mobile foreign network where the mobile user is located.

Variable-Based Security Associations

In order to reduce the security concerns during the "tunneling" of information packets to Mobile Nodes, different security associations can be formed between home and foreign networks. Security Associations, called SAs, are relationships between secure nodes, or routers, in the security framework of the Internet. The SA establishes the agreement between the two secure nodes on how the sender will cryptographically transform data before transmission.

The SA agreement requires the sending node to share information with the receiving node about the type of cryptographic method, the algorithm, and the keys used in the encryption process. The agreement is formed and the information is shared prior to the transmission of an information packet on the secure connection. When the sending node transmits an encrypted information packet, the sending node will identify the pertinent information regarding the encryption method to the receiving node. After receiving the encrypted information packet, the receiving node will use the shared information from the SA to decode the information packet.

Authentication is the process of proving someone's claimed identity, and security systems will often require authentication of the system user's identity before authorizing a requested activity. The authentication and authorization processes are often performed by an AAA server. The AAA server authenticates the identity of an authorized user, and authorizes the requested activity. Additionally, the AAA server will provide the accounting function including tracking usage and charges for use of secure transmissions links.

Figure 1:
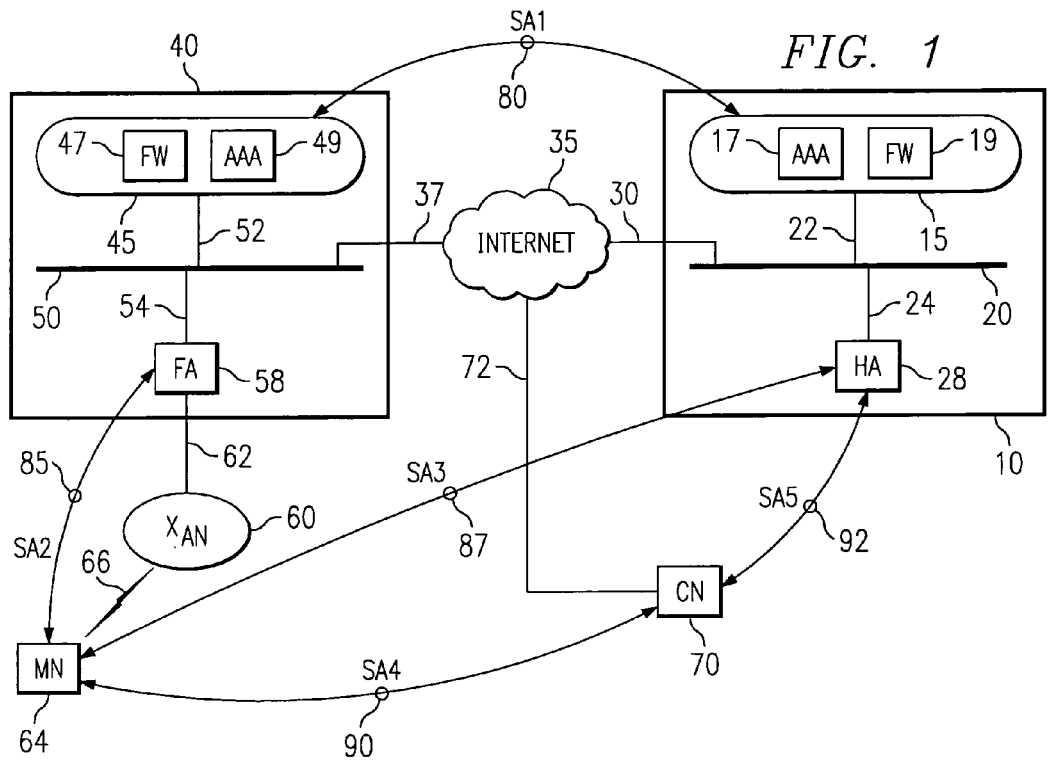
FIG. 1 is a schematic diagram of the various SAs supported in the security framework.

Looking at FIG. 1, the overall architecture of the IP-based mobile system is shown with Mobile Node 64, home network 10 and foreign network 40. The home network 10 has a central buss line 20 coupled to the home agent 28 via communication link 24, and the buss line 20 is coupled to the secure messaging gateway 15 via communication link 22. The secure messaging gateway 15 includes the AAA server 17 and firewall 19 for the home network. The home network 10 is coupled to the public Internet 35 via communication link 30. A communications link is any connection between two or more nodes on a network or users on networks or administrative domains.

The foreign network 40 has a central buss line 50 coupled to the foreign agent 58 via communication link 54, and the buss line 50 is coupled to the secure messaging gateway 45 via communication link 52. The secure messaging gateway 45 includes the AAA server 49 and firewall 47 for the foreign network. The foreign network 40 is coupled to the public Internet 35 via communication link 37.

A Mobile Node 64 is shown electronically coupled to the foreign network 40 via the communication link 66 of transceiver 60. Transceiver 60 is coupled to the foreign network via communication link 62. The Mobile Node 64 can communicate with any transceiver or Access Network coupled to the foreign network 40. The system also includes a correspondent node CN 70, which is a node wishing to communicate with the Mobile Node 64. The correspondent node CN 70 is coupled to the public Internet 35 via communication link 72.

The present invention includes the capability of forming five different SAs securely connecting various nodes and routers on the Internet. The following security associations will connect the following nodes and routers:

(1) SA1—the SA1 80 securely connects the secure messaging gateway 15 in the home network 10 to the secure messaging gateway 45 in the foreign network 40, (2) SA2—the SA2 85 securely connects the Mobile Node 64 to the Foreign Agent 58 in the foreign network 40, (3) SA3—the SA3 87 securely connects the Mobile Node 64 to the Home Agent 28 in the home network 10, (4) SA4—the SA4 90 securely connects the Mobile Node 64 to the correspondent node 70, and (5) SA5—the SA5 92 securely connects the correspondent node 70 to the Home Agent 28 in the home network.

The security scheme in the present invention covers one or more portions of the public network as mandated by the needs of the user and the level of security desired. At the very least, SA1 80 is needed to traverse the public networks in the Internet. If SA1 80 and SA2 85 (or an equivalent) are available and the foreign network 40 can be trusted, SA3 would be optional because it would cover redundant relationships already covered by SA1 and SA2. Further, SA4 is only needed if the policies at the Mobile Node 64 require its use. If SA1 80 is not available, the system should secure transmission of information packets by using SA3 87 and SA4 90 between the Mobile Node 64 and the Home Agent 28 or correspondent node 70, respectively. SA2 connection may be unnecessary if the Mobile Node 64 communicates with the Foreign Agent 58 using a code-based communication scheme, such as a CDMA-based communication scheme. Further, the security of the system could be enhanced by SA5 92 between the correspondent node 70 and the Home Agent 28 if the correspondent node 70 is not associated with the home network.

Many combinations of the SAs could be established to provide a comprehensive security framework. Of course, redundant SAs can be eliminated, such as the SA3 connection where there is already SA1 and SA2 connections available for use. As a flexible solution, the SAs available in the present invention could be configured by the user or the networks to provide the desired level of security.

Registration and AAA Redirection

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile nodes examine the agent advertisement and determine whether the mobile node is connected to its home network or a foreign network.

If the mobile node is located on its home network, no additional actions need to be taken because information packets will be routed to the node according to the standard addressing and routing scheme. If the mobile node is visiting a foreign network, however, the mobile node obtains a care-of address from the agent advertisement, and registers this care-of address with its Home Agent. The care-of address identifies the foreign network where the mobile node is located. The Home Agent uses this care-of address to tunnel data packets to the foreign network for subsequent transfer to the mobile node.

To enhance security using the present invention, mobility related messages, sometimes called control or control plane messages, transmitted between the foreign and home agents should be directed through the local AAA servers on the respective networks. This includes the AAA server 17 on the home network 10 and the AAA server 49 on the foreign network 48. Every time the Mobile Node 64 moves into a new foreign network or powers up in the foreign network, the Mobile Node 64 must negotiate a new secure SA2 85 connection with the Foreign Agent 58. While the control plane messages should be redirected through the AAA servers in the home and foreign networks, the SA2 85 connection will only be initiated after the registration request and registration response have been initially sent outside a secure connection, also called "in the clear." That is, the Mobile Node 64 will first successfully register with the Foreign Agent 58 and the Home Agent 28 without the use of a secure connection. In order to establish the SA2 85 secure connection between the Mobile Node 64 and the Foreign Agent 58 thereafter, the registration request and response must be resent using the secure connection through the AAA servers on the home and foreign networks. Any subsequent registrations, after the initial registration, are done using the SAs established during the initial registration.

Figure 2:
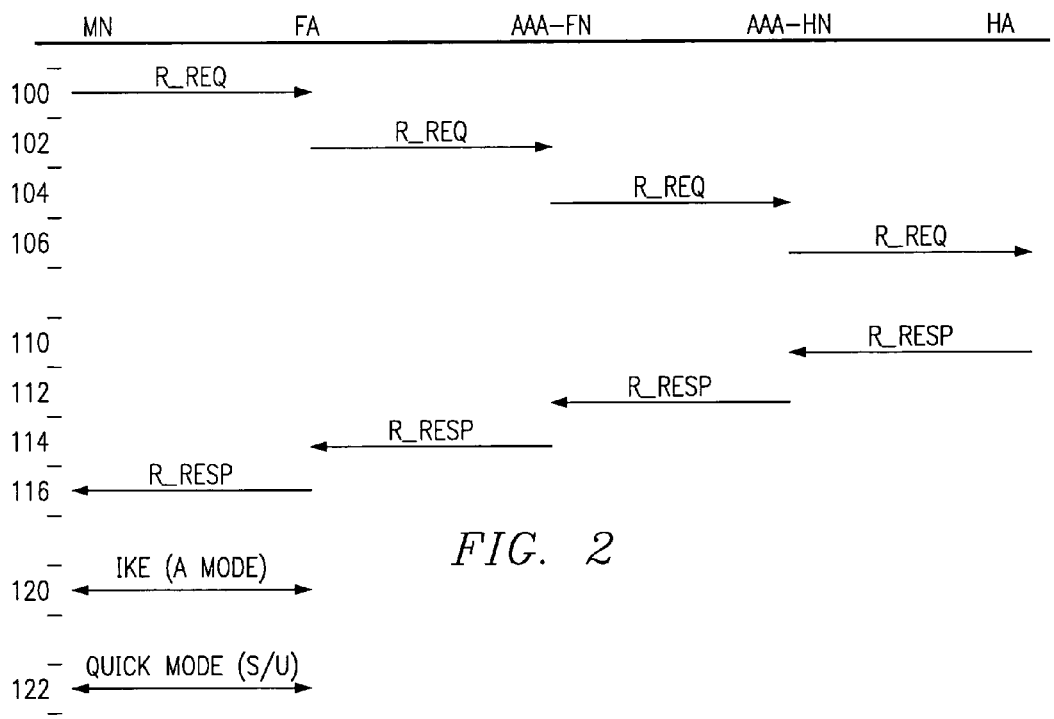
FIG. 2 is a message flow sequence for establishing an SA.

The establishment of the SA2 secure connection with the redirection of the registration request and response through the AAA servers can be seen in FIG. 2 in steps 100 to 106 where the registration request from the Mobile Node 64 to the Foreign Agent 58 is shown in step 100, the registration request from the Foreign Agent 58 to the AAA server 49 at the foreign network 40 is shown in step 102, the registration request from the AAA server 49 at the foreign network 40 to the AAA server 17 at the home network 10 in step 104, and the registration request from the AAA server 17 on the home network 10 to the Home Agent 28 in step 106.

The redirection of the registration response through the AAA servers is shown in steps 110 to 116 where the registration response from Home Agent 28 to AAA server 17 on the home network 10 is shown in step 110, registration response from AAA server 17 on the home network 10 to AAA server 49 on the foreign network 40 is shown in step 112, registration response from the AAA server 49 on the foreign network 40 to the Foreign Agent 58 is shown in step 114, and registration response from the Foreign Agent 58 to the Mobile Node 64 is shown in step 116.

If the Foreign Agent 58 is capable of establishing an SA relationship, then the agent advertisement issued by the Foreign Agent 58 should be expanded to indicate this capability to the Mobile Node 64. The Mobile Node 64 can then initiate establishment of the secure connection, and it is recommended that the Aggressive Mode of the Internet Key Exchange protocol (IKE) can be used as shown in step 120 of FIG. 2. The Quick Mode in step 122 can also be used to speed the SA set-up operation as shown in FIG. 2. Lastly, in order to enhance the registration process, the registration response from the Home Agent 28 to the Foreign Agent 58 can carry the public key associated with the Mobile Node 64, and the response could also carry the public key of the Foreign Agent 58 from the Foreign Agent 58 to the Mobile Node 64.

Some means should be used to authenticate the identity of the mobile user to the foreign agent. One method of authenticating a user identity is the use of x.509 certificates based upon a public key-based system such as the Public Key Infrastructure (PKI). A cross certification scheme may also be used through a common Service Level Agreement between the home network and the foreign network. Digital signatures could also be used to authenticate the identity of a user to a foreign network. Public keys for the Mobile Node and the foreign network can also be exchanged.

Service Level Agreements (SLAs) and Virtual Private Networks (VPNs)

Figure 3:
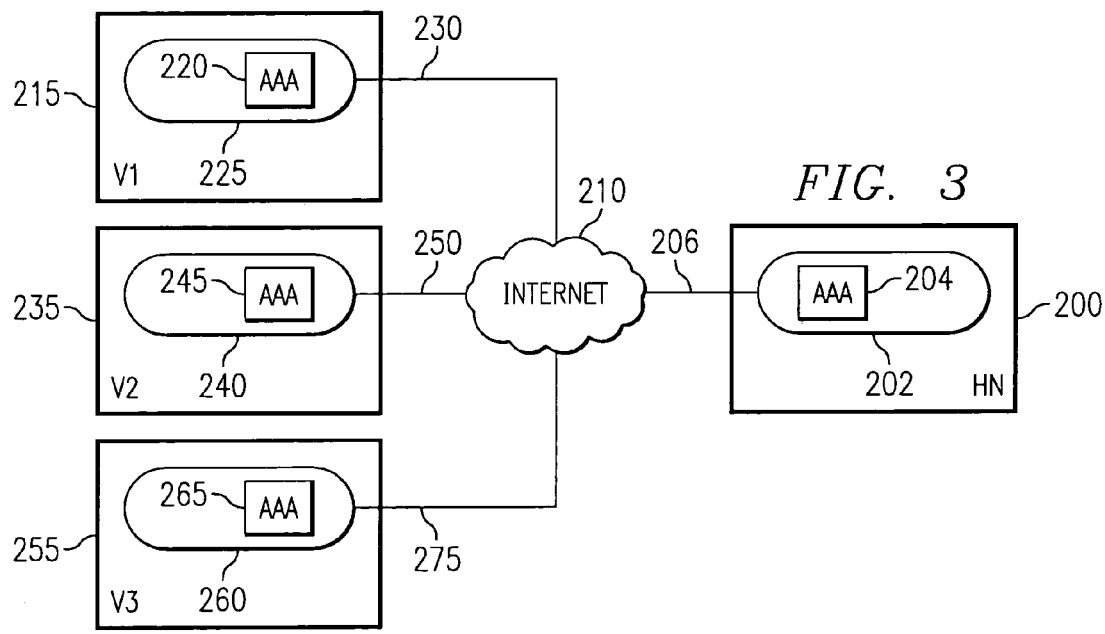
FIG. 3 is a schematic diagram of the Virtual Private Network created by a common Service Level Agreeement; and, FIG. 4 is a schematic diagram showing the SLA Broker in the network configuration.

A service level agreement (SLA) can be created between networks on the Internet to establish Security Associations between Authentication, Authorization, and Accounting ("AAA") servers on various networks. In FIG. 3, an SLA can exist between the home network 200 and the foreign networks 215. Likewise, SLA may exist between the home network 200 and the foreign networks 235 and 255, respectively.

The home network 200 includes the secure messaging gateway 202 with the AAA server 204. The secure messaging gateway 202 couples the home network 200 to the Internet 210 via communication link 206. The foreign network 215 to the Internet 210 includes the secure messaging gateway 225 with the AAA server 220. The secure messaging gateway 225 couples the foreign network 215 to the Internet 210 via communication link 230. The foreign network 235 includes the secure messaging gateway 240 with the AAA server 245. The secure messaging gateway 240 couples the foreign network 235 to the Internet 210 via communication link 250. The foreign network 255 includes the secure messaging gateway 260 with the AAA server 265. The secure messaging gateway 260 couple the foreign network 255 via communication link 275.

The AAA servers 204, 220, 245 and 265 can assist in the management of SAs and support the uniform transfer of encrypted information packets using a well-defined security protocol. An SLA can be established between the AAA servers on the several foreign networks 215, 235 and 255 and home network 200. The secure messaging gateways 202, 225, 240 and 260 also play the role as security gateway (firewall functions) for their respective network.

Routing devices know the existence of an AAA server 204, 220, 245 and 265 on a network, and all information packets transmitted in a secure mode should be routed through this routing device. One AAA server 204, 220, 245 and 265 then communicates with another AAA server on the network via a confidential communication link. By working cooperatively, the AAA servers 204, 220, 245 and 265 form a secure network for communications. Essentially, this system of SAs uses a single SLA to form a Virtual Private Network (or "VPN") between the foreign networks 215, 235 and 255 and the home network 200 thereby supporting secure tunneling of information packets among the networks on the VPN. Because a single SLA supports the networks 200, 215, 235 and 255 in the VPN shown in FIG. 3, a mobile node can roam among these networks 200, 215, 235, and 255 and securely access the network at any point in the VPN.

The AAA servers 204, 220, 245 and 265 in the VPN shown in FIG. 3 support the security gateways 202, 225, 240 and 260 for the networks 200, 215, 235 and 255, respectively. The home agents and foreign agents on the networks are aware of the AAA servers 204, 220, 245 and 265, and route the control plane messages through the AAA servers to ensure confidential communications. Policies configured at the home agent, foreign agents, or the AAA servers 204, 220, 245 and 265 indicate how the Mobile Nodes will use these secure tunnels for message transfer. The home network for the Mobile Node can also be identified from the registration request.

Secure communication links between the AAA servers 204, 220, 245 and 265 will remain in place as long as the SLAs are valid. The AAA servers 220, 245 and 265 in the foreign networks 215, 235, and 255 and AAA server 204 in the home network 200 are configured with appropriate security policies that aid in the establishment of this SA. The present invention provides a security framework for control plane messages between different domains as the Mobile Node roams throughout the VPN.

SLA Brokers

Establishing multiple SLAs among multiple service providers and networks increases the management complexity of the system. In order to reduce this management complexity and allow large-scale roaming among different networks, SLA Brokers can be established to provide a common support platform for multiple SLAs. The SLA Broker essentially becomes a consortium of SLAs from various networks, and Mobile Nodes need only have a relationship with a single SLA maintained by an SLA Broker to acquire indirect access to other SLAs through the reciprocal agreements with other SLAs maintained by the SLA Broker (and indirectly other SLA Brokers). By allowing access to all SLAs in a network, the Mobile Node can roam throughout the networks without having to establish independent relationships with the other SLAs.

Figure 4:
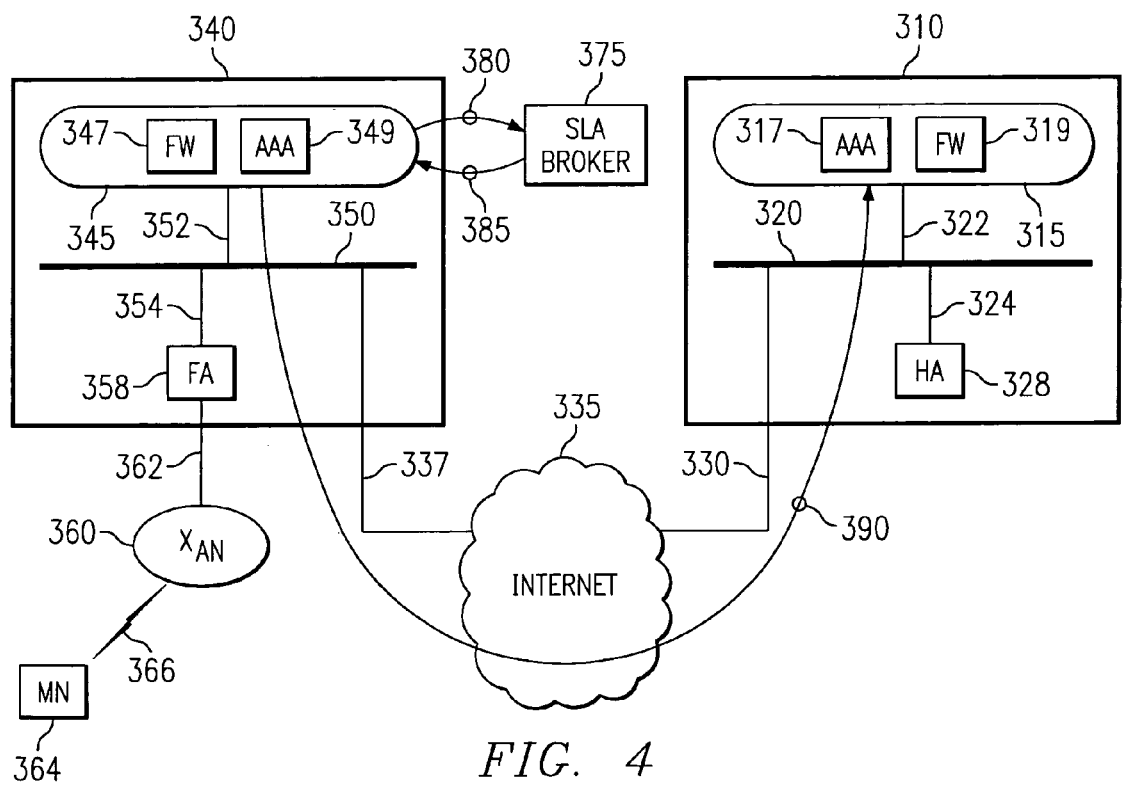

In FIG. 4, the home network 310 supports a secure messaging gateway 315 having an AAA server 317 and firewall 319. The secure messaging gateway 315 is coupled to the home network common buss line 320 via communication link 322. The home network 310 has a home agent 328 that is coupled to the home network communication buss 320 via communication link 324. The home network 310 is coupled to the public Internet 335 via communication link 330.

The foreign network 340 supports a secure messaging gateway 345 having an AAA server 349 and firewall 347. The secure messaging gateway 345 is coupled to the home network common buss line 350 via communication link 352. The foreign network 340 has a foreign agent 358 that is coupled to the foreign network communication buss 350 via communication link 354. The foreign network 340 is coupled to the public Internet 335 via communication link 337. The Mobile Node 364 communicates with the network via the cellular transceiver 360 (or any other type of Access Network coupled to the foreign network 340), which is coupled to the Foreign Agent 358 via communication link 362.

After moving to the foreign network 340 or upon power-up at that network and under the condition that no SLA exists between the foreign network 340 and the home network 310, the Mobile Node 364 will first send a registration request message to the Foreign Agent 358. The registration request and response may be sent initially in the clear to establish the relationship, but the registration request and response must be re-established later in a secure connection. In order to establish this secure connection, the Foreign Agent 358 forwards the registration request to the foreign AAA server 349, and the AAA server 349 looks at the address of the mobile node 364 from the registration request to confirm whether an SLA exists between the home network 310 and the foreign network 340. Thereafter, any registration requests and responses are established using the secure connection established initially according to the procedure described above.

After confirming that no SLA exists between the home network 310 and foreign network 340, the AAA server 349 consults with the SLA Broker 375 in communication 380. If the SLA Broker 375 is associated with the home network 310, the SLA Broker 375 sends a response 385 to the AAA server 349 with a session key that is generated to establish the SLA between the foreign and home networks. At the same time, the SLA Broker 375 sends the same session key to the AAA server 317 in the home network 310 in a different message (not shown in figure). The session key should be transmitted to the AAA servers 349 and 317 over secure communications links.

Certificates can also be used to authenticate the registration request and response protocol, where a certificate contains appropriate identification information to authenticate the identity of the networks, administrative domains and users. The SLA Broker 375 may return a certificate to the foreign AAA server 349 that is sent to the AAA server 317 at the home network 310 via the registration request. Since the home AAA server 317 has an SLA with the SLA Broker 375, the certificate presented by the foreign network 340 can be accepted and a successful registration response is returned. In this manner, the secure communication link between the SAs can also be established.

In the response to communication 385, the AAA server 349 in the foreign network 340 is also passed the IP address of the AAA server 317 in the home network. The AAA server 349 initiates a key encryption negotiation 390 with the AAA server 317 in the home network 310. The session key given by the SLA Broker 375 would be used for authentication purposes. Once the SA is set up, the messages between the Mobile Node 364 and the Home Agent 328 are transmitted over secure links.

While the invention has been particularly shown and described with respect to preferred embodiments, it will be readily understood that minor changes in the details of the invention may be made without departing from the spirit of the invention.

Having described the invention, we claim:

1. A method for securely communicating to a mobile node on a communications system having a home network for the mobile node and at least one foreign network comprising the steps of:
   requiring at least one security association between the home network and the foreign network, wherein the home network has at least one home agent network server;
   establishing at least one security association between the mobile node and the foreign network using a registration reply message to transmit a public key, said registration reply message originating at the home agent network server and transmitted to the mobile node to acknowledge registering the mobile node care-of address with the home agent network server;
   requiring that an information packet received by the home network be encrypted with an encryption mechanism;
   transmitting the information packet from the mobile node using the security associations to support secure communications from the mobile node;
   routing the information packet through a secure messaging gateway that includes a firewall and an AAA server performing authentication and accounting functions;
   coupling a service level agreement broker to the foreign network, separate from any AAA server on either the home network or the foreign network, to support establishment and maintenance of a plurality of security associations for multiple networks and multiple nodes used in communications on the communications system to include establishing and maintaining a single service level agreement for communications among multiple networks and multiple nodes; and
   decoding information from the encrypted information packet at the home network to retrieve the information.

2. The method of securely communicating to a mobile node in claim 1 further comprising the step of:
   establishing a security association between the home network and a correspondent node.

3. The method of securely communicating to a mobile node in claim 1 further comprising the step of:
   establishing a security association between the mobile node and a correspondent node.

4. The method of securely communicating to a mobile node in claim 3 further comprising the step of:
   establishing a security association between the home network and a correspondent node.

5. The method of securely communicating to a mobile node in claim 1 further comprising the step of:
   encrypting information using a public key algorithm.

6. The method of securely communicating to a mobile node in claim 1 further comprising the step of:
   encrypting information using a private key algorithm.

7. The method of securely communicating to a mobile node in claim 1 further comprising the step of:
   supporting the secure communication for the security association between the foreign network and the mobile node using a code-based cellular communication system.

8. The method of securely communicating to a mobile node in claim 1 further comprising the step of:
   requiring multiple security associations between a plurality of foreign networks and the home network.

9. The method of securely communicating to a mobile node in claim 8 further comprising the step of:
   establishing a service level agreement to manage the secure communication of information packets on the multiple security associations.

10. The method of securely communicating to a mobile node in claim 9 further comprising the step of:
    establishing a broker to assist in the use of service level agreements on the secure communications system.

11. A method for securely communicating to a mobile node on a communications system having a home network for the mobile node and at least one foreign network comprising the steps of:
    requiring at least one security association between the home network and the mobile node, wherein the home network has at least one home agent network server, and using a service level agreement broker to establish and maintain a plurality of security associations;
    transmitting a registration message containing a public key, said registration message originating at the home agent network sever and routed to the mobile node to acknowledge registering the mobile node care-of-address with the home network;
    requiring that an information packet transmitted to the home network be encrypted using an encryption mechanism;
    transmitting the information packet from the mobile node using the security associations to support secure communications from the mobile node;
    routing the information packet through a secure messaging gateway comprising a firewall blocking access of unsecured packets and an AAA server, separate from the service level agreement broker, performing authentication and accounting functions, said service level agreement broker operating from any AAA server on either the home or foreign network to support establishment and maintenance of a plurality of security associations from multiple networks and multiple nodes used in communications on the communications system to include establishing and maintaining a single service level agreement for communications among multiple networks and multiple nodes; and
    decoding information from the encrypted information packet at the home network to retrieve the information.

12. The method of securely communicating to a mobile node in claim 11 further comprising the step of:
    establishing a security association between the home network and a correspondent node.

13. The method of securely communicating to a mobile node in claim 11 further comprising the step of:
    establishing a security association between the mobile node and a correspondent node.

14. The method of securely communicating to a mobile node in claim 13 further comprising the step of:
    establishing a security association between the home network and a correspondent node.

15. The method of securely communicating to a mobile node in claim 11 further comprising the step of:
    encrypting information using a public key algorithm.

16. The method of securely communicating to a mobile node in claim 11 further comprising the step of:
    encrypting information using a private key algorithm.

17. The method of securely communicating to a mobile node in claim 11 further comprising the step of:
    establishing multiple security associations between a plurality of foreign networks and the home network.

18. The method of securely communicating to a mobile node in claim 17 further comprising the step of:
    establishing a service level agreement to manage the secure communication of information packets on the multiple security associations.

19. The method of securely communicating to a mobile node in claim 18 further comprising the step of:
    maintaining a plurality of service level agreements at the service level agreement broker for use on the secure communications system, said service level agreements including a plurality of networks.

20. A system for securely communicating to a mobile node in a wireless communications network comprising:
    a home network having a home agent server coupled to a router capable of directing information packets to and from the home network;
    a foreign network having a foreign agent coupled to a router capable of directing information packets to and from the foreign network and a transceiver capable of performing wireless communications with at least one mobile node in the transmission range of the transceiver for the foreign network;
    a broker entity separate from any AAA server functioning as a consortium of a plurality of security associations, said broker used to establish security associations that can include a single security level agreement established on multiple nodes among different network to form a virtual private network;
    said security associations including a security association established between the home network and the foreign network and a security association established between the mobile node and the foreign network using registration messages to transmit a public key, the registration messages used for registering the mobile node care-of address with the home network and addressing to route between the home network and the mobile node, both security associations used to support the secure communication of information packets from the mobile node to the home network; and
    said information packets routed through a secure messaging gateway comprising a firewall blocking access of unsecured packets and an AAA server performing authentication and accounting functions to track secure communication transmissions, said AAA server separate from the broker.

21. The system of securely communicating to a mobile node in claim 20 further comprising:
    a security association between the home network and a correspondent node.

22. The system of securely communicating to a mobile node in claim 20 further comprising:
    a security association between the mobile node and a correspondent node.

23. The system of securely communicating to a mobile node in claim 22 further comprising:
    a security association between the home network and a correspondent node.

24. The system of securely communicating to a mobile node in claim 20 further comprising:
    a public key encryption means to secure communications.

25. The system of securely communicating to a mobile node in claim 20 further comprising:
 a private key encryption means to secure communications.

26. The system of securely communicating to a mobile node in claim 20 further comprising:
 multiple security associations between a plurality of foreign networks and the home network.

27. The system of securely communicating to a mobile node in claim 26 further comprising:
 a service level agreement to manage the secure communication of information packets on the multiple security associations.

28. The system of securely communicating to a mobile node in claim 27 further comprising:
 a broker to assist in the use of service level agreements on a plurality of networks on the secure communications system by establishing a single service level agreement with a common security association on multiple nodes.

29. A system for securely communicating to a mobile node in a wireless communications network comprising:
 a home network having a home agent network server coupled to a router capable of directing information packets to and from the home network;
 a foreign network having a foreign agent coupled to a router capable of directing information packets to and from the foreign network and a transceiver capable of performing wireless communications with at least one mobile node in the transmission range of the transceiver for the foreign network;
 a security association established between the home network and the mobile node using a registration message, said registration message used for registering the mobile node care-of address with the home network and addressing to transmit between the home network and the mobile node, the security association used to support the secure communication of information packets from the mobile node to the home network said security association established using a broker supporting a plurality of security associations, said broker existing and functioning separately from any AAA server to support establish and maintain a plurality of security associations from multiple networks and multiple nodes used in communications on the communications system to include establishing and maintaining a single service level agreement for communications among multiple networks and multiple nodes; and
 a security gateway including a firewall function blocking unsecured packet access to the network and an AAA server performing authentication and accounting functions used to track secure communication transmission using the security association, said AAA server separate from said broker.

30. The system of securely communicating to a mobile node in claim 29 further comprising:
 a security association between the home network and a correspondent node.

31. The system of securely communicating to a mobile node in claim 29 further comprising:
 a security association between the mobile node and a correspondent node.

32. The system of securely communicating to a mobile node in claim 31 further comprising:
 a security association between the home network and a correspondent node.

33. The system of securely communicating to a mobile node in claim 29 further comprising:
 a public key encryption means to secure communications.

34. The system of securely communicating to a mobile node in claim 29 further comprising:
 a private key encryption means to secure communications.

35. The system of securely communicating to a mobile node in claim 29 further comprising:
 multiple security associations between a plurality of foreign networks and the home network.

36. The system of securely communicating to a mobile node in claim 35 further comprising:
 a service level agreement to manage the secure communication of information packets on the multiple security associations.

37. The system of securely communicating to a mobile node in claim 36 further comprising:
 said broker to assist in the use of service level agreements having a plurality of security associations for a plurality of nodes on the secure communications system and functioning as a consortium of security level agreements on a plurality of networks forming said system.

* * * * *